July 11, 1972   J. S. PRENTICE   3,676,242

METHOD OF MAKING A NONWOVEN POLYMER LAMINATE

Filed Aug. 13, 1969

INVENTOR.
JAMES S. PRENTICE,
BY Timothy L. Burgess
ATTORNEY.

United States Patent Office 3,676,242
Patented July 11, 1972

3,676,242
METHOD OF MAKING A NONWOVEN POLYMER LAMINATE
James S. Prentice, Baytown, Tex., assignor to Esso Research and Engineering Company
Filed Aug. 13, 1969, Ser. No. 861,536
Int. Cl. B29j 5/08
U.S. Cl. 156—62.4                      11 Claims

ABSTRACT OF THE DISCLOSURE

A laminar structure is produced by thermally bonding a nonwoven mat of melt-blown polyolefin fibers to a polyolefin film. The nonwoven mat may be thermally bonded to the film either as the film or the nonwoven mat is produced or by pressing a preformed nonwoven mat of polyolefin fibers onto a hot polyolefin film.

BACKGROUND OF THE INVENTION (1) Field of the invention

The present invention is directed to a laminar structure formed by thermally bonding a nonwoven mat of polyolefin fibers to a polyolefin film. More specifically, the present invention is directed to thermally bonding the nonwoven mat to the film in the operation in which either the nonwoven mat or the polyolefin film is produced. In a specific aspect of the present invention, a preformed nonwoven mat is pressed against a hot polyolefin film preferably as the film is being produced, so as to thermally bond the nonwoven mat to the polyolefin film.

(2) Prior art

U.S. ----------------------------------- 3,341,394
British pat. ----------------------------- 1,055,187

SUMMARY OF THE INVENTION

The present invention is directed to a laminar structure produced from a nonwoven mat of melt-blown polyolefin fibers and a polyolefin film which are thermally bonded together. The laminar structure has a combination of properties which make it suitable for a wide spectrum of film uses.

The laminar structure may be produced in several different ways. Preferably the laminar structure is made by pressing a nonwoven mat of polyolefin fibers against a heated polyolefin film so as to thermally bond the mat and the film together. This pressing operation is preferably carried out as the polyolefin film is being produced. In another aspect of the present invention, the polyolefin resin, preferably polypropylene, is melt blown to produce polyolefin fibers, and the fibers are blown directly onto the film, which is either at ambient temperature or at temperatures approaching the softening point of the film. In still another aspect of the present invention, a laminar structure may be produced which has more than one layer of nonwoven mats or polyolefin films.

DESCRIPTION OF THE PREFERRED EMBODIMENTS

Figure 1:
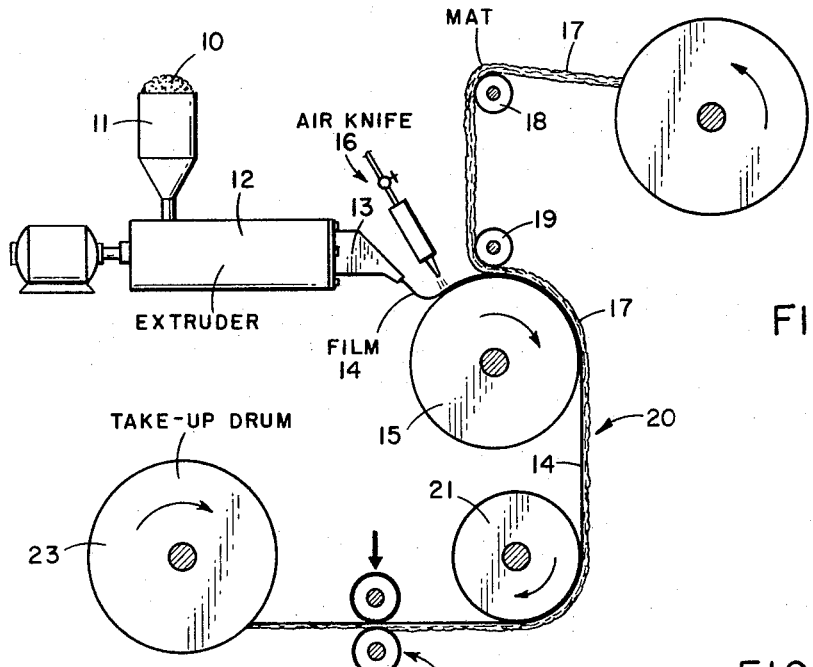
FIG. 1 is a schematic view of a modified polyolefin film-forming operation wherein a preformed nonwoven mat is pressed against the hot film to form a laminar structure of the nonwoven mat and polyolefin film.

Referring to the drawings, and particularly to FIG. 1, pellets of a polyolefin resin 10 are introduced into a hopper 11 of an extruder 12 where the polyolefin resin is extruded through a film die head 13. The polyolefin film 14 is picked up on chill roll 15 where the film partially cools. An air knife 16 is positioned at the approximate point where the film 14 is collected on chill roll 15 to uniformly press the film 14 onto the chill roll 15. A preformed nonwoven mat 17 is passed over guide rolls 18 and 19 and pressed onto the film 14 while it is still hot. The laminar structure 20 is then passed over a second chill roll 21 where the laminar structure is cooled. A pressure roll 22 may be used to compact the laminar structure before it is rolled as a roll 23.

Figure 2:
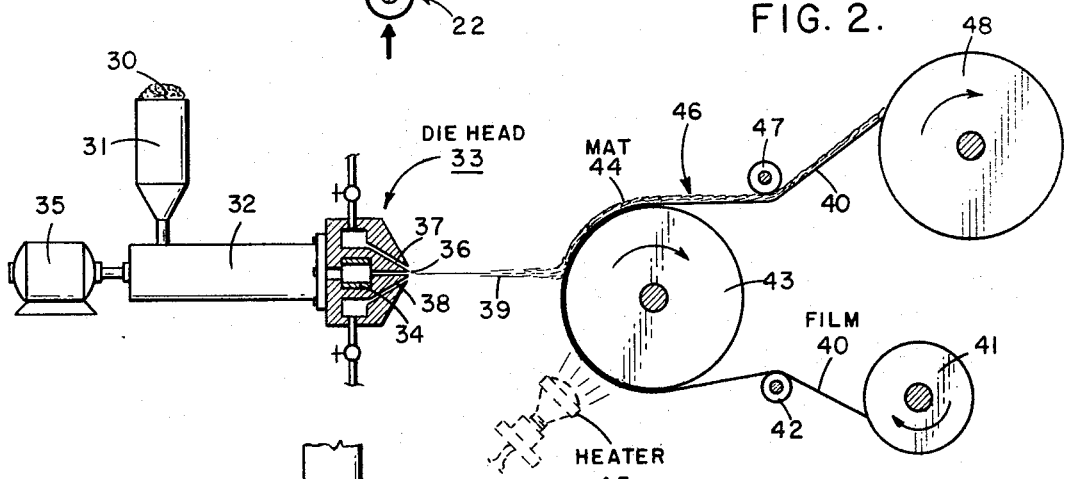
FIG. 2 is a schematic view of a melt-blowing process to form the nonwoven mat which is collected on a polyolefin film to form the laminar structure of the present invention.

Referring to FIG. 2, the polyolefin resin, preferably polypropylene, as pellets 30, is introduced into a hopper 31 of an extruder 32 wherein the polyolefin is heated and forced through the extruder 32 into a die head 33. Where the polyolefin resin is polypropylene, it is heated in the extruder 32 at temperatures in excess of 600° F. up to about 900° F. and preferably within the range of 600–800° F. This thermal treatment of the polypropylene resin may be carried out entirely within the extruder 32 or partially in the die head 33 which may contain heating plates 34. The heated resin is forced by a drive 35 through the extruder 32 into the die head 33, which contains a row of die openings 36, and from the die openings 36, into a gas stream. The gas stream, which attenuates the polymeric resin, is supplied through gas jets 37 and 38, respectively, which are located immediately above and below the row of die openings 36 in die head 33. The hot gas, preferably air, attenuates the molten polyolefin as fibers 39 essentially in a plane away from the die openings 36. The fibers 39 are collected on a polyolefin film 40 which is continuously advanced across the path of the fibers 39. The polyolefin film 40, which may be a film from any $C_2$ to $C_8$ monoolefin and which may be either a homopolymer or copolymer of such polyolefins but preferably is either polyethylene or polypropylene, is unwound from a roll 41 using a guide roll 42, if necessary to a takeup drum 43 which is positioned in the path of the fibers 39. The drum 43 may be positioned from 1 to 24 inches from the die openings 36 in the die head 33. If the distance between the die openings 36 and the takeup drum 43 is less than six inches, preferably about four inches, the fibers are still hot enough that they provide sufficient heat to cause thermal bonding between the nonwoven mat 44 and the polyolefin film 40 without the addition of further heat. If further heat is necessary to provide the thermal bonding between the nonwoven mat 44 and film 40, a heating device 45 such as a radiant heater or other heat device may be positioned to heat the film 40 and make its surface tacky. The nonwoven mat 44 builds up on the tacky film 40 with thermal bonding of the fibers 39 to the film 40. The laminar structure 46 is drawn away from the takeup drum 43 over guide roll 47 to takeup roll 48. As the distance between the die openings 36 and takeup drum 43 is increased in excess of six inches, greater heat is required in order to make the surface of the film sufficiently tacky to obtain the thermal bonding of the nonwoven mat to the film 40.

Figure 3:
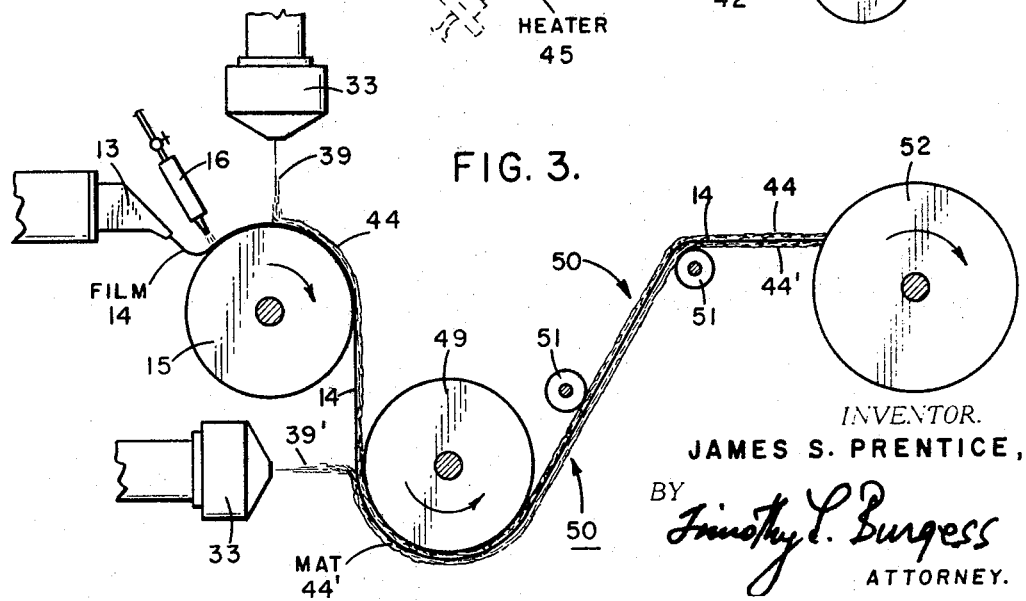
FIG. 3 is a schematic view of a process for forming a laminar structure wherein the nonwoven mat is melt blown directly on a polyolefin film in its formation with another melt-blown mat applied to the opposite side of the film.

FIG. 3 illustrates a modification of both the melt blowing of a nonwoven mat and the formation of a polyolefin film in making a laminar structure of the present invention. The reference numerals used in FIG. 3 are the same as those used in FIGS. 1 and 2 when referring to the same parts. A polyolefin film is produced by extruding the resin from a film die 13 as a film 14 onto a chill roll 15. An air knife 16 may be used to force the film against the chill roll 15. Polyolefin resin is forced through a melt-blowing die head 33 onto the film 14 as fibers 39 to build up a nonwoven mat 44 which is thermally bonded to the film 14. This laminar structure is passed over the chill roll 15 to a second roll 49. Another die head 33 for melt blowing a polyolefin may be positioned so that the fibers from this die head form a second nonwoven mat 44′ on the opposite side of the film 14. This three-ply laminate structure 50 is then removed, utilizing guide rolls 51 if necessary, to a takeup roll 52.

The laminar structures of the present invention may be made with a wide range of properties. A fluid impermeable laminar structure may be produced by utilizing the fluid impermeability of polyolefin films. However, in some instances if the laminar structure is to be used as a bandage material or the like there may be air openings in the film which may be either uniformly or nonuniformly positioned in the film. Furthermore, the laminar structures of the present invention may be made with varying degrees of compressibility. The melt blown nonwoven mats of polyolefin fibers can be varyingly formed from a well-compressed to a fluffy mat, and accordingly, can give wide varieties of characteristics to the laminar structures of the present invention. Depending upon the conditions used in the melt blowing, the nonwoven structure will have fibers which vary in diameter between about 1 and 30 microns. Mats with fine fibers may have greater tensile strength but very little tear resistance, whereas mats may, be made with fibers which are larger in diameter and which add to the tear resistance of the laminar structure.

The wide range of properties of the laminar structure make it suitable for such film uses as cablewrap material, lining material, wrapping materials, bandages, bottlecap liners, insulation, surgical drapes, and the like. For example, if the laminar structure is used as a bottlecap liner, it requires fluid impermeability as well as slight compressibility to yield and provide a tight seal when the cap is applied to the bottle.

The present invention will be further illustrated by the following specific examples which are given by way of illustration and not as limitations on the scope of the invention.

EXAMPLE 1

Polypropylene was extruded through a film extruder at about 450° to 550° F. at the die head to form a film (less than 5 mils thick) onto a chill roll. The chill roll (12-inch diameter) had the usual air knife removed and a roll of melt-blown polypropylene nonwoven web was hand-pressed against the polypropylene film on the chill roll about 3 to 6 inches from the point of contact of the film with the chill roll. The roll of polypropylene nonwoven web was unwound by the driven chill roll. The melt-blown polypropylene nonwoven web was thermally bonded to the just extruded polypropylene film. The bonding was not uniform due to the varied pressure in pressing the web against the film and the point of contacting the film and web. A fluid impermeable, compressible laminar structure was formed.

EXAMPLE 2

A two-mil piece of cast polypropylene film was held taut over a 6″ x 6″ metal screen. The polypropylene film was then slowly moved passed the die head of an extruder having a melt-blowing die head. Polypropylene was being melt blown and the film was passed at a distance of about 4″ to 6″ from the die head. A nonwoven mat of polypropylene fibers was collected on the film and it was observed that thermal bonding had occurred between the fibrous mat and the polypropylene film. A compressible laminar structure was formed.

The nature and object of the present invention having been completely described and illustrated and the best mode thereof contemplated set forth, what I wish to claim as new and useful and secure by Letters Patent is:

1. A process of making a laminar structure of a nonwoven mat and a polyolefin film, comprising:
   extruding molten polyolefin resin through a row of die openings in a die head;
   passing a stream of hot gas through gas slots immediately above and below said row of die openings to attenuate the molten extruded resin as fibers essentially in a plane away from said die openings; and
   collecting the attenuated fibers on said film under conditions effective to thermally bond said fibers as a nonwoven mat to said film.

2. The process of claim 1 in which said fibers and said film are both formed from polypropylene.

3. The process of claim 1 in which said film is fluid impermeable.

4. The process of claim 1 in which the attenuated fibers are collected on said film at a distance from 1–24 inches from said die openings.

5. The process of claim 1 in which the film is at a temperature between ambient temperature and the softening point of the polyolefin film.

6. The process of claim 5 in which the distance from the die openings to the film is no greater than six inches.

7. The process of claim 5 in which the distance from the die openings to the film is greater than six inches and said film is tacky.

8. The process of claim 1 in which the film is polypropylene.

9. The process of claim 7 in which the film is heated to make the film tacky.

10. The process of claim 1 in which said film contains air openings therein.

11. The process of claim 1 in which said fibers have a diameter from about 1 to about 30 microns.

References Cited

UNITED STATES PATENTS

| | | | |
|---|---|---|---|
| 3,131,113 | 4/1964 | Arbit et al. | 161—151 |
| 3,341,394 | 9/1967 | Kinney | 156—306 |
| 3,459,627 | 8/1969 | Vosburgh, Sr. | 161—150 |
| 3,276,928 | 10/1966 | Pearson et al. | 156—377 |
| 3,509,009 | 4/1970 | Hartmann | 156—181 |

FOREIGN PATENTS

| | | |
|---|---|---|
| 1,055,187 | 1/1967 | Great Britain. |

BENJAMIN A. BORCHELT, Primary Examiner

H. J. TUDOR, Assistant Examiner

U.S. Cl. X.R.

156—197, 369